United States Patent [19]

Hughes

[11] Patent Number: 4,604,499

[45] Date of Patent: Aug. 5, 1986

[54] COMPUTER TELEPHONE ACCESS SECURITY PROCESSOR

[75] Inventor: Lawrence R. Hughes, Lauderdale Lakes, Fla.

[73] Assignee: Raymond F. Hughes, Tamarac, Fla.

[21] Appl. No.: 582,392

[22] Filed: Feb. 24, 1984

[51] Int. Cl.$^4$ .................. H04M 11/00; H04L 9/00
[52] U.S. Cl. .................. 179/2 DP; 179/2 A; 179/84 VF; 178/22.08; 178/22.09
[58] Field of Search .............. 179/1.5 R, 1.5 E, 2 A, 179/2 CA, 2 DP, 6.11, 84 C, 84 VF; 178/22.01, 22.08, 22.09; 340/825.48, 825.74

[56] References Cited

U.S. PATENT DOCUMENTS

| | | | |
|---|---|---|---|
| 3,359,369 | 12/1967 | Ioric et al. | 179/2 DP |
| 3,515,806 | 6/1970 | Spraker | 179/2 DP |
| 3,849,764 | 11/1974 | Wang et al. | 179/2 A X |
| 3,937,889 | 2/1976 | Bell, III et al. | 179/2 A X |
| 3,984,637 | 10/1976 | Caudill | 179/2 DP |
| 4,115,807 | 9/1978 | Pires . | |
| 4,135,150 | 1/1979 | Quigley | 179/84 VF X |
| 4,310,720 | 1/1982 | Check, Jr. | 178/22.08 |
| 4,430,728 | 2/1984 | Beitel et al. | 179/2 DP X |
| 4,493,947 | 1/1985 | Loveless | 179/84 VF X |

Primary Examiner—Keith E. George

Attorney, Agent, or Firm—George Teacherson

[57] ABSTRACT

A "state of the art" Computer Security Processor (CSP) is disclosed to stop the "hacker" (a person who enjoys computers as a hobby) by making it virtually impossible to "break into" (a term meaning to falsely gain access to) a computer. A processor is disclosed comprising two units, a transmitter and a receiver. The transmitter sends a special code over the telephone line to the receiver which recognizes a correct or a fraudulent code and then allows access to the host computer provided the code is correct. The unit uses special frequencies other than Touch Tone ®, and additionally boasts a wide variety of security codes numbering $8^{10}$ power. These codes can be changed as often as desired. The unit is lightweight, small, and has a low power drain, yet is extremely effective. The transmitter is self-contained and fully portable. The receiver uses normal 120 VAC current and is also portable. Both these units can be built in small housings. The unit does not let the caller hear the modem answering tone, so a "hacker" would not even know he had called a computer. The computer is fully isolated from the caller until the CSP/Receiver recognizes a proper code. The unit will prove to be a low cost answer to a high cost problem.

1 Claim, 4 Drawing Figures

STANDARD TONES

|        | 1209Hz | 1336Hz | 1477Hz |
|--------|--------|--------|--------|
| 697Hz  | 1      | 2      | 3      |
| 770Hz  | 4      | 5      | 6      |
| 852Hz  | 7      | 8      | 9      |
| 941Hz  | *      | 0      | #      |

CRYSTAL NEEDED TO OBTAIN ABOVE FREQUENCY IS 3.579 MHz

CSP FORMAT

|        | 1780Hz | 1949Hz | 2154Hz |
|--------|--------|--------|--------|
| 1026Hz | 1      | 2      | 3      |
| 1130Hz | 4      | 5      | 6      |
| 1255Hz | 7      | 8      | 9      |
| 1369Hz |        | 10     |        |

CRYSTAL NEEDED TO OBTAIN ABOVE FREQUENCY IS 5.236 MHz

FIG. 4

COMPUTER TELEPHONE ACCESS SECURITY PROCESSOR

BACKGROUND OF THE INVENTION

The instant invention was designed for the ever growing computer security problem and more particularly to protect "modem terminals".

The problem of protecting computer modem installations from unauthorized access by unauthorized persons is rampant in this technological society.

The prior art has actually used the keyboard belonging to the system it was supposed to protect making direct, unauthorized access more probable. It has used multiple codes in order to enable the system. If the codes were frequency enabled, the frequencies used were most probably that of standard telephone Touch Tone ® variety. Other systems use a computer Random Access Memory to provide codes.

It is the scope of this invention to provide a device that would act as an electronic "dead bolt lock", by not allowing access to top secret or confidential information from an outside intruder which one might call a "hacker". It is the intention of this invention, one, to prevent autodial modem users from calling up sequenced telephone numbers and having their computers tell them what telephone numbers answered with a tone. Two, to give the CSP/Receiver and CSP/Transmitter a set of dual tone frequencies that are not of the standard Touch Tone Variety, and will not interfere with inter-office signalling systems, because these units will be on a subscriber's line and not a trunk line. It is assumed that by not using Touch Tone ® frequencies, it will be impossible for a "hacker" to know what frequencies the CSP/Transmitter and CSP/Receiver are using unless divulged by the user. Three, some of the systems on the market today use Touch Tone ® frequencies to enter code numbers. When using Touch Tone ® frequencies those systems stand a chance of being accessed by a "hacker", and by an ordinary Touch Tone ® telephone. There are some new systems on the market that will call you if your security code that you entered was correct. In this type of system, the time process is much too long, whereas in the instant system you can enter the security code by turning on a single switch. if "the Key" fits the lock the whole process will be completed in approximately 1.5 seconds. Furthermore, the instant system does not allow the "hacker" to sit for hours, literally trying to use his computer keyboard to in many cases successfully break into computer systems.

SUMMARY OF THE INVENTION

An object of the instant invention is to provide a means of security for Financial Institutions, Government Agencies, Insurance Companies, etc.

It is an additional object to provide a means in which to protect top secret or confidential information from the public, unauthorized individuals, or foreign countries.

It is a further object of the instant invention to provide a system that will not allow communications between a host computer and a remote (via telephone lines) computer, until one of the eight to the tenth power numbers of available codes is correct.

It is a still further object of the instant invention to be used on virtually any computer system.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawings.

BRIEF DESCRIPTION OF THE DRAWINGS

FIG. 4 shows an example of the frequencies used in the invention and the standard set of frequencies.

DESCRIPTION OF THE PREFERRED EMBODIMENT

When we refer to the term "Not Standard" of the telephony industry, we are referring to Touch Tones ® (a registered trade mark of A.T. & T.) as the standard of the industry, mainly because it is very unlikely this group of frequencies will ever be changed. Please refer to FIG. 4 for more information on frequencies.

Figure 2:
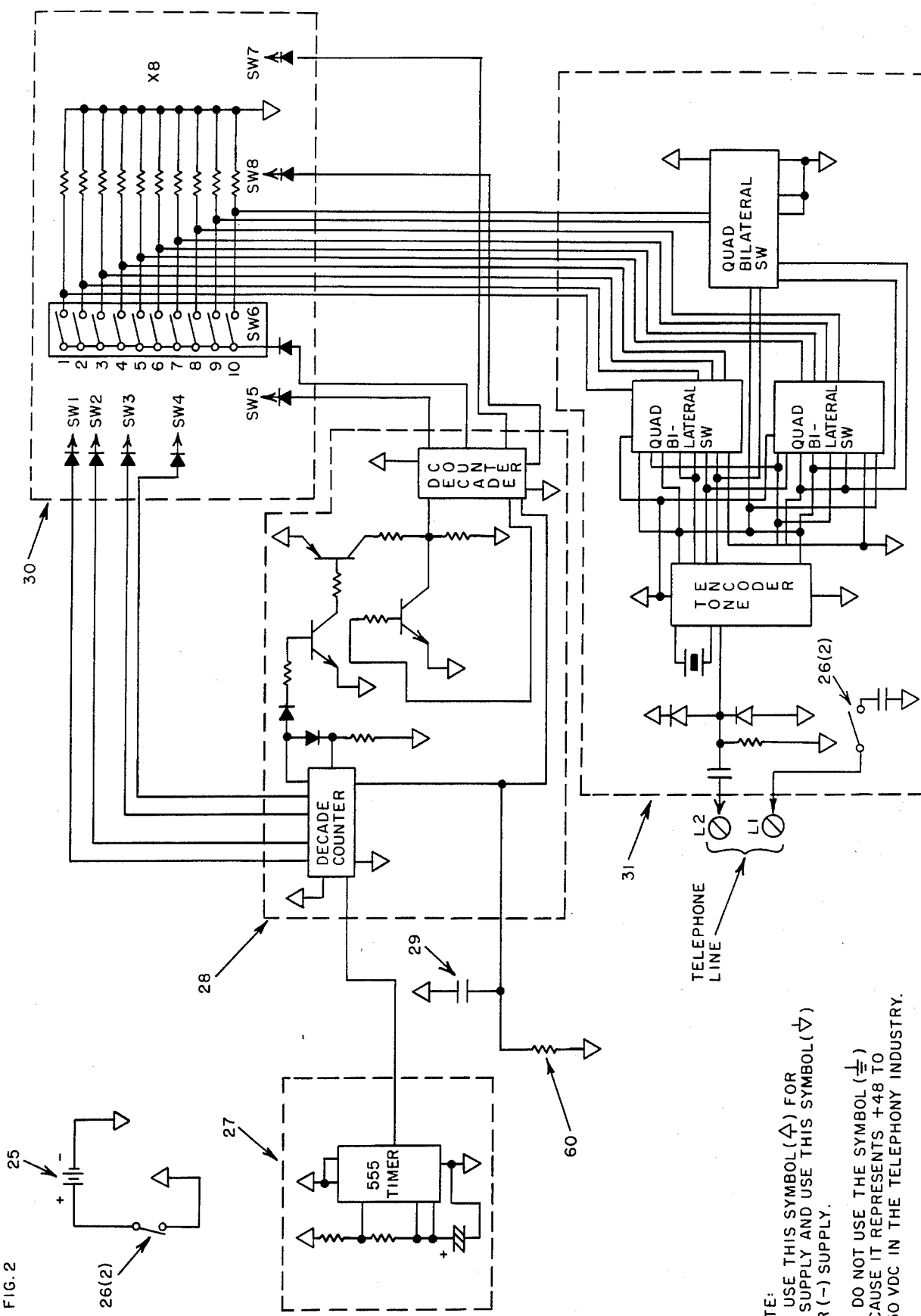
FIG. 2 is a circuit schematic and block diagram of the CSP/Transmitter.

Now turning to FIG. 2, the CSP/Transmitter 24, comprises in combination a 9 volt battery as Power Source 25, a double pole double throw switch as ON-OFF Switch 26, a 555 timer and a few external components make up Oscillator 27. Also, two 4017 decade counters and a few external components make up a sequencer counter up to 18. Two of the 18 counts are used to switch the decade chips on and off. The 16 remaining counts are divided this way, 16 divided by 2=8 counts for skipping every other count on the decade chips. The 8 remaining counts represent a sequence for the security code. This group of components make up Decade Counter 28. A 0.1 MFD/Capacitor is used to provide a reset pulse to Decade Counter 28, when Power Source 25 is first turned on. This component is defined as Capacitor 29. Eight individual sets of Dip Switches boasting 10 switches per set and 8 diodes and 10 resistors provide a means for setting an 8 digit code, whereas, only one switch may be on at any given time in a set. This array is defined as Security Code Programming Array 30. Three 4066 Quad, Bi-lateral Switches (chips) and a Tone Encoder Mostek 5087, along with a few external components, allows us to obtain a sequenced output of dual tones to the telephone line by having the quad, bi-lateral switches make up a two of seven format for the input of the tone encoder chip. These components are defined as Modulator 31. A 10,000 OHM resistor is used to reference the reset pins to a low state and also is used to keep Capacitor 29 discharged. This is designated as Resistor 60.

Figure 3:
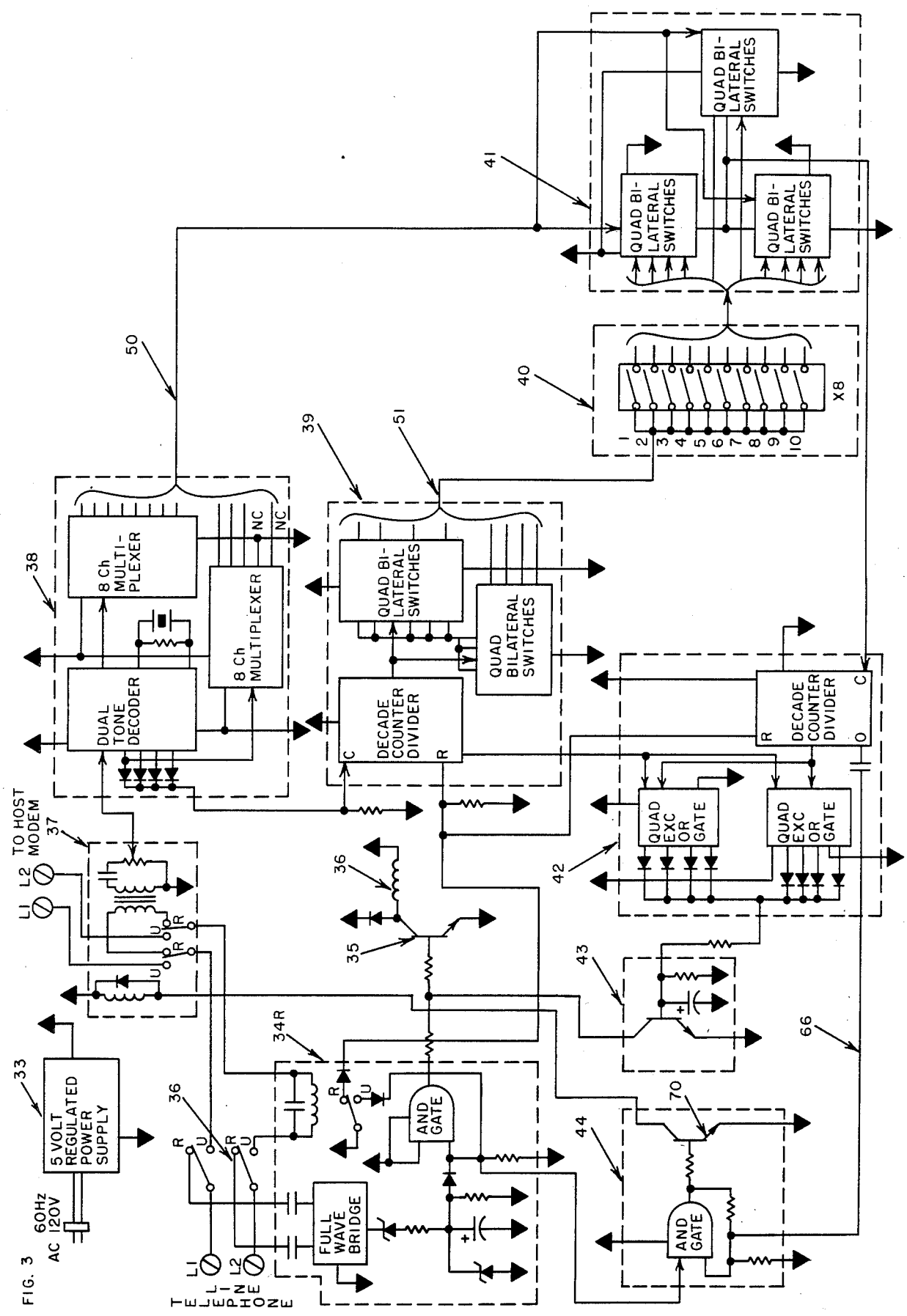
FIG. 3 is a circuit schematic and block diagram of the CSP/Receiver.

Ring Detector 34R consists of a full wave bridge rectifier, one relay and a few well known components as illustrated in FIG. 3. These components detect the presence of ring voltage on the telephone line and respond accordingly as we will discuss further on.

Transistor 35 is a NPN 2N2222 Transistor which is used to energize Relay 36 when Ring Detector 34R outputs a positive voltage. Relay 36 is a 5 volt double pull double throw relay which is used to answer incoming calls.

Relay/Transformer Combination 37 is used in two different ways. First to act as a dummy load by allowing loop current to flow through the primary of the transformer and back out to telephone line thus giving us a means of holding the incoming call after Relay 36 energizes. Furthermore, it allows us to capture dual-tones out the secondary and passing only sine waves to Decoder 38. We will discuss the second part of Relay/Transformer Combination 37 further on.

Decoder 38 consists of a dual-tone decoder chip, two 8 channel multiplexer chips, and a few well known electronic components. This gives us a means to decode the incoming tones from Relay/Transformer Combination 37, thus allowing the two multiplexer chips to output in a digital format only one positive voltage for a correct decode. Ths is out pulsed to Bus Line 50. Only one line of the ten line bus can have a positive voltage at any given time. We also use 4 diodes tied to the dual-tone decoder chip 4 bit Binary output port to provide us with clock pulses for every set of dual-tones that are detected.

Sequencer 39 consists of decade counter/divider chip as used in CSP/Transmitter 24. We use two quad, bi-lateral switches to set up a sequence in which every clock pulse from Decoder 38 sets the counter one count forward turning on a different switch in the quad, bi-lateral switches providing us with a means to supply a positive voltage to turn on one column of switches in Security Code Matrix 40 via Bus 51 at a rate matched to that of the CSP/Transmitter 24.

Security Code Matrix 40 consists of eight sets of Dip Switches and each set having ten individual switches labeled 1–10. We will discuss Security Code Matrix 40 further on.

Figure 1:
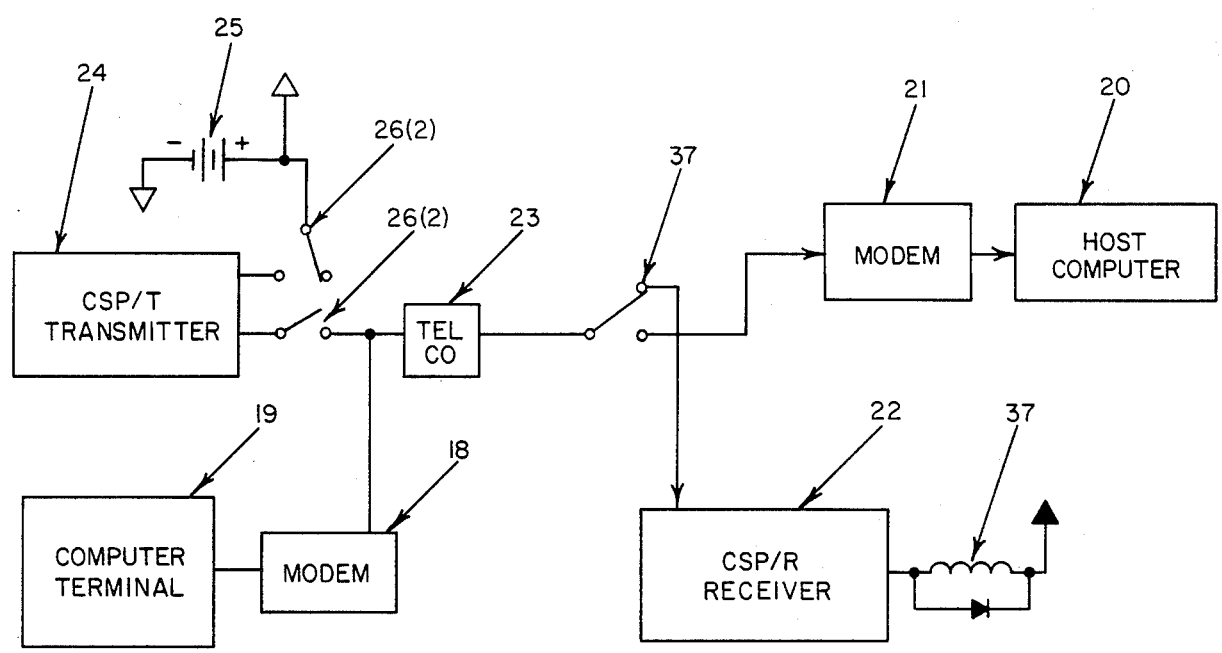
FIG. 1 is a block diagram of a typical installation.

Referring to FIG. 1, the CSP/Transmitter 24 gets connected in parallel to the telephone company central office 23 by providing a means of capacitively coupling transmitter 24 to office 23. Simultaneously, computer terminal 19 being connected to modem 18 provides a path to central office 23 and transmitter 24. This allows utilization of all available modems. Once the security code leaves transmitter 24, it arrives at relay/transformer 37 via combination office 23. Because relay/transformer combination 37 is in the relaxed condition, the security code arrives at CSP/Receiver 22. It is now the responsibility of receiver 22 to provide a foolproof method of checking the security code. When relay/transfer combination 37 energizes, it is now unrelaxed allowing complete data transmission between computer terminal 19 and host computer 20 through its respective modem 21.

Now turning to FIG. 2, the CSP/Transmitter comprises, in combination, power source 25, on-off switch 26, oscillator 27, decade counter 28, capacitor 29, security code programming array 30, modulator 31, and resistor 60. When double pole, double throw, on-off switch 26 is placed in the closed position, it supplies current from power source 25 through on-off switch 26 to oscillator 27, decade counter 28, capacitor 29 and modulator 31 simultaneously. Switch 26 also closes a transmission path between modulator 31 and the telephone line.

When switch 26 is in the closed position, capacitor 29 quickly charges supplying a reset pulse to counter 28, which sets counter 28 to zero. Counter 28 will only leave zero if oscillator 27 is outpulsing digital pulses at a rate of "typically" 80 milliseconds ON, and 80 milliseconds OFF.

During the output of digital pulses from oscillator 27, the decade counter 28 will step to the first count. This is the first digit of the security code. When the decade counter 28 arrives at the first digit, the number 1 output of counter 28 will go high, and then pass through one line of an 8 line bus going to security code programming array 30.

Array 30 consists of 8 columns of 10 switches per column and 1 diode per column. All columns are identically wired.

Modulator 31 will determine what digit of the first column was programmed by using quad, bi-lateral switches. Then the Tone Encoder Modulator 31 will select a proper dual tone frequency that will be modulated onto a standard telephone line for approximately 80 milliseconds of time. After this short time oscillator 27 will outpulse another digital pulse to counter 28. Counter 28 will step to the next count which is blank and wait for the next count to step to next column in security code programming array 30. The first column in security code programming array 30 is now disabled. This process will continue until all 8 columns of security code programming array 30 are disabled. At the time that all 8 columns of security code programming array 30 are disabled, counter 28 will stop counting.

Counter 28 has 2 chips, each of which is a decade counter capable of counting 10 counts per chip. Counter 28 uses every other count for proper timing purposes. Counter 28 also uses a standard, well-known self-detection circuit to stop itself, and also a standard, well-known circuit to switch to next counter.

When counter 28 has stopped counting, it is up to the user to turn off switch 26. When switch 26 is turned off, capacitor 29 discharges through a resistance 60 to negative supply. The dual tone frequencies that modulator 31 modulated to the telephone line are not a standard of the telephone industry, but are well within the telephony bandwidth. The CSP/Transmitter 24 is capable of having as many different codes as $8^{10}$ power. The total time for complete transmission of a security code is approximately 1.5 seconds.

As shown in FIG. 3, a five volt regulated power supply 33 is operated by 120 VAC house current. It supplies all up arrows and down arrows. Up arrows refer to positive electrical supply while down arrows signify negative supply. When relay 36 is in the relaxed condition, the ring voltage is fed to ring detector 34R where it will then supply a positive voltage and cause ring detector 34R to turn on transistor 35 which will energize relay 36 supplying loop current through ring detector 34R and relay/transformer combination 37. Relay/transformer combination 37 is actually a set of relay contacts which are normally relaxed and fed to the primary of an audio transformer. One of the outputs of the secondary goes to the negative supply. The other side goes to a feed through capacitor and a potentiometer, then to decoder 38. Decoder 38 consists of a dual tone decoder/clock/multiplexers/. When a ring voltage energizes relay 36 and ring detector 34R, both will be latched providing a path for loop current through relay/transformer combination 37 completing the loop to keep the telephone line activated.

If the CSP/Transmitter 24 is turned on from a remote location supplying the 8 digit dual-tone multi-frequency security code to relay/transformer combination 37 and then to decoder 38, decoder 38 takes this code and converts it to hexadecimal output which goes to four diodes which have their cathodes tied together and provide the clock pulses for sequencer 39. Decoder 38 also supplies a 10 output busline 50 in which only one output can be high at a time provided that there is a proper dual tone frequency. This 10 output busline 50 goes to error detector 41.

Sequencer 39 takes the clock pulses provided by decoder 38 which drive sequencer 39, to provide an output sequence to security code matrix 40. Matrix 40 consists of 8 columns, each consisting of 10 manually operated switches that are numbered 1-10. The output of sequencer 39 through bus 51 is connected to security code matrix 40 in the following way: Each line of the 8 line bus 51 is connected separately to each column of the 8 columns in security code matrix 40. All 10 switches of each of the 8 columns have the common side of the switches tied together. The 10 line bus line 50 coming from decoder 38 goes to error detector 41. Only one line can be high at a time. Error error detector 41 is set up with 3 quad, bi-lateral switches giving the capabilities of 12 independent switches. Only 10 of these switches are used. If the first pair of dual-tone frequencies that are coming down the telephone line are decoded by decoder 38 equalling a "1" and if sequencer 39 stepped to the first count it would then provide security code matrix 40 with a high on the common side of the first column. Depending upon which switch in the first column is closed, it would tell error detector 41 which switch to turn on. If the closed switch position in security code matrix 40 equalled a "1", the first quad, bi-lateral switch in error detector 41 would be closed. When the first switch in error detector 41 is closed it will take the number "1" output from decoder 38 and pass it through the closed switch in error detector 41 giving us a clock pulse to go to Security Code Clearance Gate 42. Gate 42 consists of a decade counter and 2 quad "Exclusive OR Gates". When the pulse from error detector 41 goes to security code clearance gate 42, it sets the Decade Counter Divider Cnip that is in security code clearance gate 42 to a "1". This output is then run to one of the inputs of an "Exclusive OR Gate". The other input of the "Exclusive OR Gate" should see a high from sequencer 39. This would be the number "1" output of the Decade Counter Chip in sequencer 39. If the 2 inputs to the "Exclusive OR Gate" are both high the output will be low. The outputs of the "Exclusive OR Gates" go to the anodes of 8 diodes. All the cathodes are tied together. When the outputs of the "Exclusive OR Gates" are low—nothing happens. This is not a fraudulent code. After this first process, it will repeat itself in a sequence at whatever rate that the CSP/Transmitter 24 is transmitting, approximately 80 ms ON and 80 ms OFF. It will repeat itself 8 times provided that the security code that the CSP/Transmitter 24, FIG. 2, was the correct code. We will assume the code was correct, then sequencer 39 would reset itself and also provide a reset pulse for security code clearance gate 42. When security code clearance gate 42 resets, the decade counter returns to zero causing the zero output pin to go high. This low to high transition is passed through a capacitor as a positive pulse through line 66 to clearance gate initiator 44. In clearance gate initiator 44, one input of an "And Gate" is tied to ring detector 34R giving us a high from the ring detector 34R. The other input of clearance gate initiator 44 is tied low through a resistance to the negative supply. When a positive pulse arrives to this pin from security code clearance gate 42, it will pulse clearance gate initiator 44 causing the output to go high serving two purposes. The first purpose is to provide through a resistor a supply high to the input of the "And Gate" causing the "And Gate" to latch. The second purpose is to provide a supply high through a resistor to the base of a NPN Transistor 70 allowing us to pass negative current through the emitter and out of the collector to relay/transformer combination 37. Relay/transformer combination 37 will then energize causing the contacts of relay/transformal combination 37 to go to the unrelaxed position, allowing loop current to flow to the host modem, meaning user was not a "hacker" or was not a fraudulent call. If this had been a fraudulent call, security code clearance gate 42 would not receive a pulse from error detector 41, yet sequencer 39 would receive a pulse putting sequencer 39 out of synchronization with security code clearance gate 42 causing a mismatch on the input of one of the "Exclusive OR Gates" of security code clearance gate 42. This would cause the output of the "Exclusive OR Gate" to go high which passes positive voltage through one of the eight diodes to fraud detector circuit 43. When fraud detector circuit 43 receives a high output from security code clearance gate 42, it causes fraud detector circuit 43 to turn ON passing negative current to the base of transistor 35 through a resistor causing transistor 35 to turn OFF. This would cause relay 36 to de-energize breaking the flow of loop current thus dropping the line.

As soon as relay 36 de-energized, the CSP/Receiver 22 would now be in the standby mode waiting for the next call. While in this standby mode, the relay contacts are in the relaxed position allowing positive voltage to be applied to sequencer 39 and to security code clearance gate 42. This will reset all chips. As soon as a caller initiates ring detector 34R, the relay contacts in ring detector 34R will be in the unrelaxed condition allowing sequencer 39 and security code clearance gate 42 to synchronize to the CSP/Transmitter 24 output rate.

It will be understood that variations could be made on the embodiments described herein without departing from the essential features of the invention and the preferred embodiment is not intended to limit either the spirit or the scope of the invention as set forth in the appended claims, thus:

We claim:

1. A computer security processor comprising a transmitter unit and a receiver unit in communication with each other via a telephone system; wherein said transmitter unit comprises: means for manually setting a desired code, means responsive to the setting means for generating dual frequency tone signals corresponding to the desired code, means for connecting the generating means to a telephone line for transmitting the dual frequency tone signals over the telephone system, and means for manually initiating operation of the generating and transmitting means;

said receiver unit comprises: means for manually setting the desired code in the receiver unit, means connected to a second telephone line for receiving dual frequency tones transmitted over said telephone system and deriving a received code therefrom, means connected to the manual setting means and the receiving means for comparing the received code to the desired code, means responsive to the comparing means for recognizing a fraudulent code and disconnecting the receiving means from the second telephone line, and means responsive to the comparing means for recognizing receipt of the desired code and connecting a computer to said second telephone line; and wherein said dual frequency tone signals have frequencies different from dual frequency tone signals used by the telephone system for dialing purposes.

* * * * *